Figure 1:
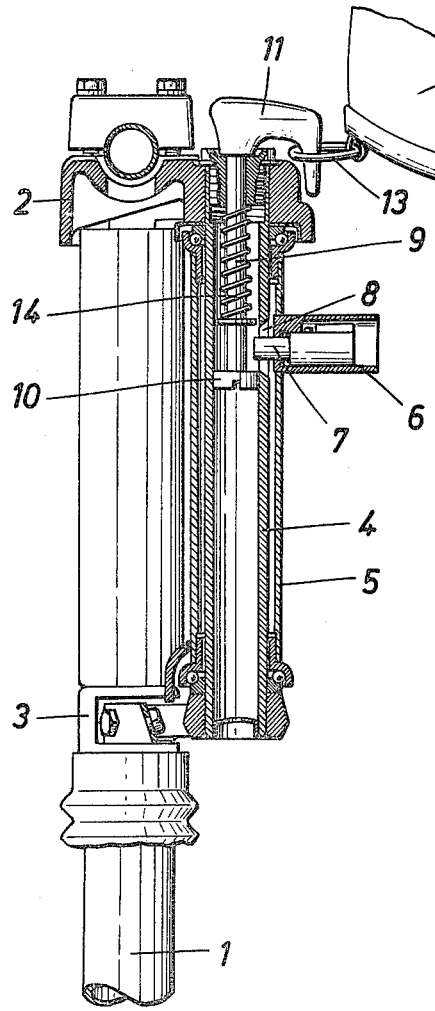

United States Patent [19]

Meier

[11] 4,201,398

[45] May 6, 1980

[54] DEVICE FOR KEEPING A CRASH HELMET ON A TWO-WHEELED MOTORCYCLE

[75] Inventor: Karl Meier, Lassnitzhöhe, Austria

[73] Assignee: Steyr-Daimler-Puch Aktiengesellschaft, Vienna, Austria

[21] Appl. No.: 928,611

[22] Filed: Jul. 27, 1978

[30] Foreign Application Priority Data

Apr. 7, 1978 [AT] Austria .................................. 2452/78

[51] Int. Cl.² ............................................ E05B 69/00
[52] U.S. Cl. ..................... 280/289 L; 70/59; 70/233; 224/31; 248/553
[58] Field of Search ................. 224/42.45 R, 42.46 R, 224/29 R, 30 R, 39, 41, 31, 273; 70/59, 233; 248/203, 551, 553; 280/202, 289 R, 289 L, 289 A, 289 H

[56] References Cited

U.S. PATENT DOCUMENTS

| 960,131 | 5/1910 | Wilson et al. | 70/59 X |
|---|---|---|---|
| 1,079,655 | 11/1919 | Lissner | 70/59 X |
| 3,399,855 | 9/1968 | Shirai | 224/39 X |
| 3,805,565 | 4/1974 | McLarnon | 70/59 |
| 4,096,715 | 6/1978 | Lipschutz | 70/59 |

FOREIGN PATENT DOCUMENTS

353413 5/1922 Fed. Rep. of Germany .............. 70/59

*Primary Examiner*—Jerold M. Forsberg
*Attorney, Agent, or Firm*—Kurt Kelman

[57] ABSTRACT

The device is provided in a two-wheeled vehicle comprising a tubular steering head, a tubular fork shaft rotatably mounted in said tubular steering head and having a shell aperture, two fork blades, upper and lower fork bridges firmly connecting said fork blades to said fork shaft, and a steering lock having a bolt and operable to move said bolt into said tubular fork shaft through said shell opening to said locking position, and out of said tubular fork shaft. A rod is longitudinally slidably mounted in said tubular fork shaft and has a lower end portion which is enlarged in width and extends under said bolt when the latter is in said locking position. A hook is secured to said lock and movable therewith between a lower position, in which said hook cooperates with said upper fork bridge to form a closed latch therewith, and an upper position, in which said hook is spaced above said upper fork bridge.

2 Claims, 3 Drawing Figures

DEVICE FOR KEEPING A CRASH HELMET ON A TWO-WHEELED MOTORCYCLE

This invention relates to a device for keeping a crash helmet on a two-wheeled motor vehicle provided with a steering lock, which is secured to the steering head and has a bolt which can be transversely moved in a locking direction through a shell opening in a tubular fork shaft, which is rotatable in the tubular steering head and to which the two tubular blades of the front wheel fork are firmly connected by upper and lower fork bridges.

When the bolt of the lock protrudes through the shell opening into the tubular fork shaft, the latter can no longer be rotated in the tubular steering head so that the front wheel fork cannot be pivotally moved and the vehicle cannot be steered. For safety reasons, the driver and the pillion rider of a two-wheeled vehicle are required to wear crash helmets in many countries. In such case it is often a problem to find a suitable accommodation for the crash helmet or helmets after a ride or during a rest because it is inconvenient and often impossible for the user of the vehicle to carry the crash helmet when he leaves the vehicle. On the other hand, a crash helmet left at the vehicle may be stolen. Whereas it is known to provide the vehicle with a lock for keeping the crash helmet at a suitable location of the vehicle, e.g., at the luggage carrier, such an arrangement requires additional operations because it is necessary to operate not only the steering lock but also the lock for securing the crash helmet or crash helmets. A second lock increases the costs of manufacturing and buying the vehicle.

It is an object of the invention to eliminate these disadvantages and to provide a device which is of the kind stated first hereinbefore and enables a theft-proof keeping of a crash helmet at the vehicle without need for a second lock.

This object is accomplished according to the invention by the provision of a hook, which forms a closed latch together with the upper fork bridge and can be pulled upwardly to open the eyelet, which hook is secured to a rod, which is longitudinally movably mounted in the tubular fork shaft and has an end that is enlarged in width and when the latch is closed extends under the bolt of the lock when the same is in locking position.

When it is desired to keep the crash helmet, it is sufficient to pull up the hook and to engage the hook with a ring provided on the crash helmet, whereafter the hook is lowered to close the latch. When the bolt of the steering lock is moved to its locking position to lie over the enlarged head of the rod of the lowered hook, an opening of the latch thus formed and a removal of the crash helmet will be reliably prevented until the lock has been opened. The crash helmet kept by this device can rest safely on the fuel tank, which is in most cases provided behind the steering head. It will be understood that one or two crash helmets can be engaged with the hook. In any case, a theft of the crash helmet is prevented by the lock which is anyway provided for the steering lock and this is accomplished with a relatively low structural expenditure.

To ensure that the hook will always be kept in a closed position, the rod is biased by a spring, which is accommodated in the tubular form shaft and urges the rod downwardly so that the force of the spring must be overcome when the hook is pulled up to open the latch. When the hook is released, the hook and rod are automatically returned to their initial position. The crash helmet cannot fall down as the steering lock is opened because the spring keeps the latch closed.

When the steering lock has been closed, the device cannot be removed because the spring and rod are disposed inside the tubular fork shaft and the hook prevents also a loosening of the nut on the fork shaft.

Figure 2:
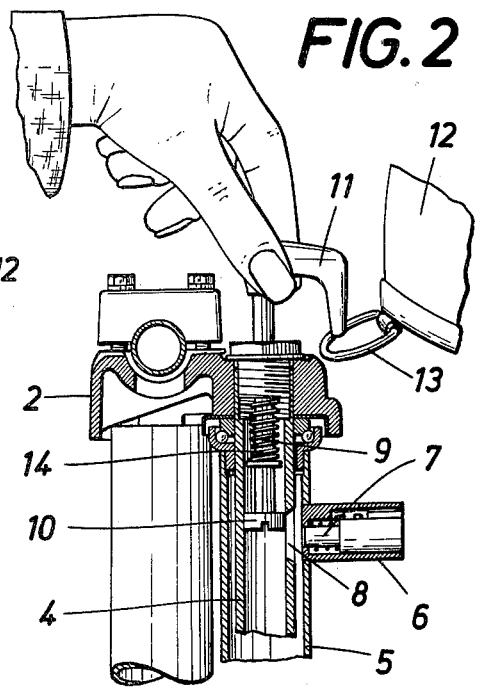
Figure 3:
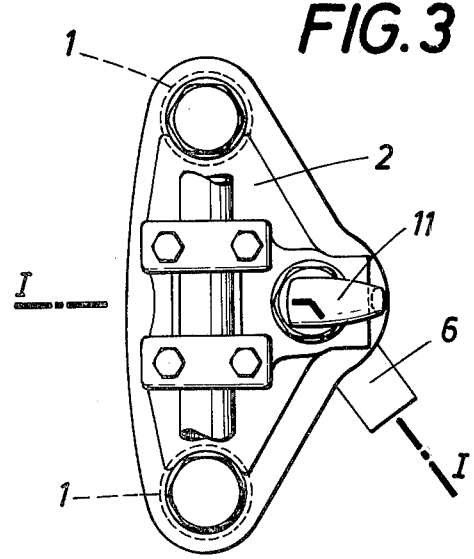

The subject matter of the invention is shown by way of example on the accompanying drawing, in which FIG. 1 is a sectional view taken on line I—I in FIG. 3 and shows the upper portion of the front wheel fork and the steering head of a two-wheeled motorcycle with the helmet-keeping device in its locked position, FIG. 2 is a similar view showing the device as the crash helmet is released, and FIG. 3 is a top plan view showing the steering head.

The two tubular blades 1 of the front wheel fork of a two-wheeled motor vehicle are firmly connected to the tubular fork shaft 4 by upper and lower fork bridges 2, 3. The tubular fork shaft 4 is rotatably mounted in the tubular steering head 5, which is firmly connected to the vehicle frame, not shown. A steering lock 6 is secured to the tubular steering head 5. The bolt 7 of the lock 6 is displaceable transversely to the axis of the tubular steering head 5 and of the tubular fork shaft 4. In the locking position, shown in FIG. 1, the bolt 7 of the lock protrudes inwardly through a shell opening 8 of the tubular fork shaft and thus prevents a rotation of the tubular fork shaft and a steering of the vehicle.

A rod 9 is longitudinally slidably mounted in the tubular fork shaft 4 and is enlarged in width at its lower end 10. A hook 11 is screwed into the rod 9 and in the locked position shown in FIG. 1 forms a closed latch together with the upper fork bridge 2. A ring 13 provided on the crash helmet 12 can be engaged with the hook 11. The enlarged end 10 of the rod 9 extends under the bolt 7 when the same is in locking position so that the hook 11 cannot be pulled up and the latch cannot be opened in that position. When the bolt 7 has been retracted to open the steering lock 6, the hook 11 can be pulled upwardly against the force of a spring 14 which urges the rod 9 downwardly. As a result, the ring 13 and with it the entire crash helmet 12 is released (FIG. 2). When the hook 11 is released, it is returned to its initial position shown in FIG. 1 by the spring 14.

What is claimed is:

1. In a two-wheeled vehicle comprising a tubular steering head, a tubular fork shaft rotatably mounted in said tubular steering head and having a shell aperture, two fork blades, upper and lower fork bridges firmly connecting said fork blades to said fork shaft, and a steering lock having a bolt and operable to move said bolt into said tubular fork shaft through said shell aperture to a locking position, and out of said aperture into a released position:

a device for keeping a crash helmet on the vehicle, which device comprises a rod longitudinally slidably mounted in said tubular fork shaft and having a lower end portion enlarged in width, and an upper hook portion secured to said rod and movable therewith between a lower position, in which said hook portion cooperates with said upper fork bridge to form a closed latch therewith, and an upper position, in which said hook portion is spaced above said upper fork bridge, said enlarged lower end portion extending under said bolt when the latter is in the locking position consequently locking the closed latch, whereby the crash helmet is attached to the vehicle when the hook portion forms the closed latch and is released when the hook portion is in the upper position.

2. A device as set forth in claim 1, which comprises a spring which is accommodated in said tubular fork shaft and urges said rod downwardly.

* * * * *